United States Patent
Apts et al.

(10) Patent No.: US 7,069,561 B1
(45) Date of Patent: Jun. 27, 2006

(54) METHOD AND SYSTEM FOR COMMUNICATION BETWEEN APPLICATION PROGRAMS AND A NETWORK

(75) Inventors: Yoeri Apts, Mechelen (BE); Philip Marivoet, Kapellen Op Den Bos (BE)

(73) Assignee: Sony Service Centre (Europe) N.V., Londerzeel (BE)

( * ) Notice: Subject to any disclaimer, the term of this patent is extended or adjusted under 35 U.S.C. 154(b) by 0 days.

(21) Appl. No.: 09/246,271

(22) Filed: Feb. 8, 1999

(30) Foreign Application Priority Data

Feb. 9, 1998 (EP) .................................. 98200379

(51) Int. Cl.
*G06F 13/10* (2006.01)
(52) U.S. Cl. ..................................... 719/321; 719/312
(58) Field of Classification Search ................ 709/213, 709/328, 321, 315; 719/312, 321
See application file for complete search history.

(56) References Cited

U.S. PATENT DOCUMENTS

| | | | | |
|---|---|---|---|---|
| 5,619,647 A | * | 4/1997 | Jardine | 709/240 |
| 5,826,010 A | * | 10/1998 | Joseph et al. | 395/186 |
| 5,954,794 A | * | 9/1999 | Fishler et al. | 709/213 |
| 6,289,393 B1 | * | 9/2001 | Phillips et al. | 709/315 |
| 6,338,079 B1 | * | 1/2002 | Kanamori et al. | 718/104 |
| 6,393,496 B1 | * | 5/2002 | Schwaderer | 709/328 |
| 6,499,065 B1 | * | 12/2002 | Hyder et al. | 719/321 |
| 6,535,929 B1 | * | 3/2003 | Provino et al. | 719/321 |
| 6,807,667 B1 | * | 10/2004 | Bar et al. | 719/328 |

FOREIGN PATENT DOCUMENTS

EP 0 790 564 A2 8/1997

OTHER PUBLICATIONS

Tanenbaum A S, "Computer Networks" 1992, Computer Networks, NR 2nd Edition, pp. 9-27.*
Tanenbaum A S, "Computer Networks" 1992, Computer Networks, NR and 2nd Edition, pp. 9-27.*
Tanebaum A S: "Computer Networks" 1992, Computer Networks, NR 2nd Edition Tanebaum A S XP002071762, p. 9, line 14—p. 27, line 17.

* cited by examiner

*Primary Examiner*—William Thomson
*Assistant Examiner*—Andy Ho
(74) *Attorney, Agent, or Firm*—Frommer Lawrence & Haug LLP; William S. Frommer

(57) ABSTRACT

The present invention relates to a method for communication between an application program and network device driver program through intermediate structure software, comprising the steps of:
 a. supplying of application data units from the application program to a first program object being part of the intermediate structure software;
 b. performing of first functions of the first program object on the application data units;
 c. supplying of resulting first data units from the first program object to a second program object being part of the intermediate structure software;
 d. performing of second functions of the second program object on the first data units;
 e. supplying of the resulting second data units to the network device driver program.

21 Claims, 2 Drawing Sheets

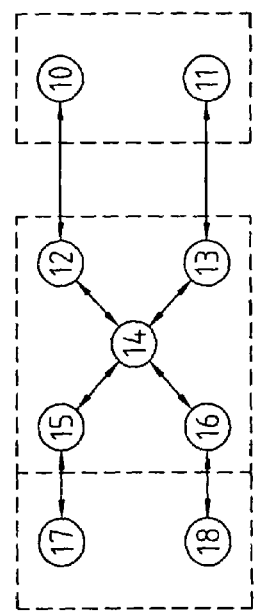
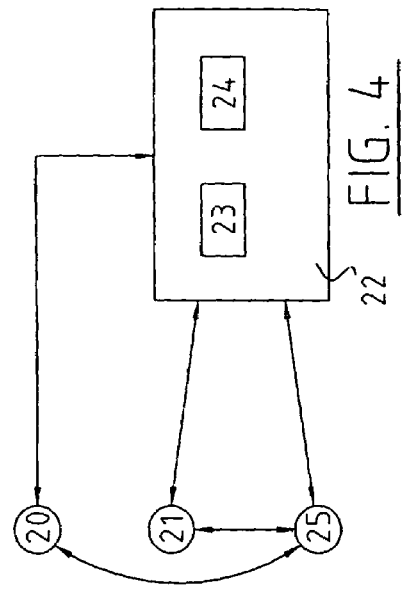
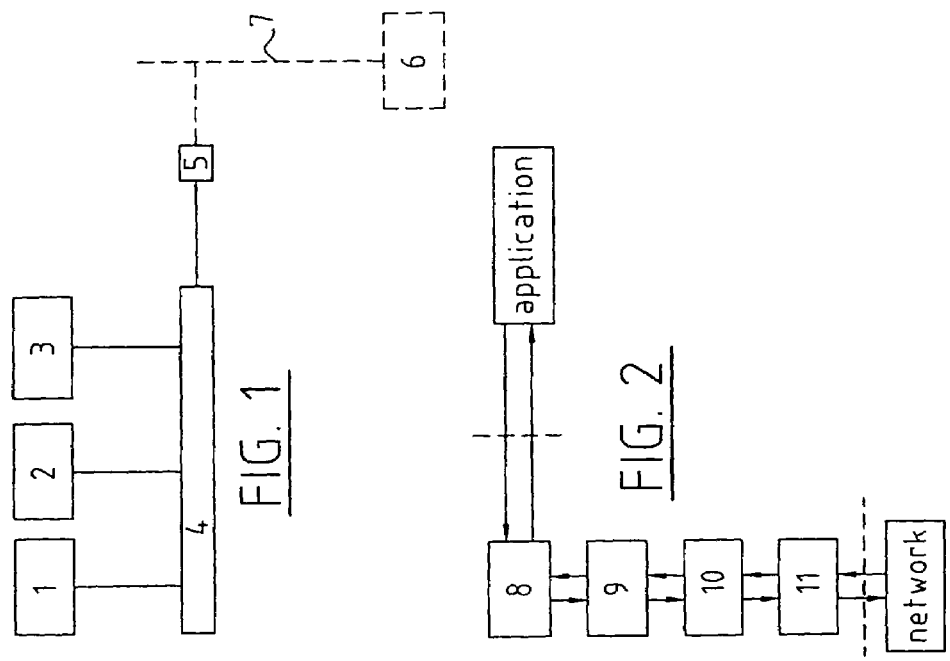
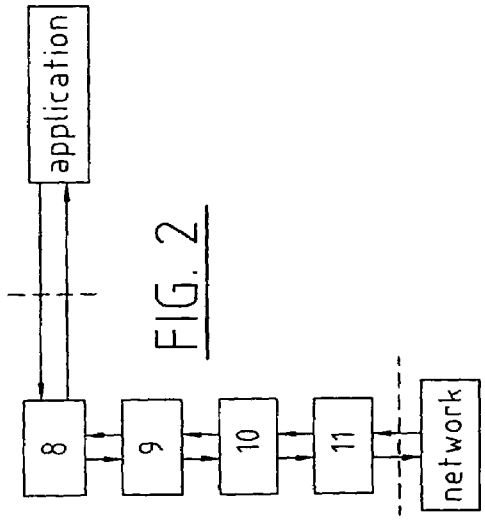

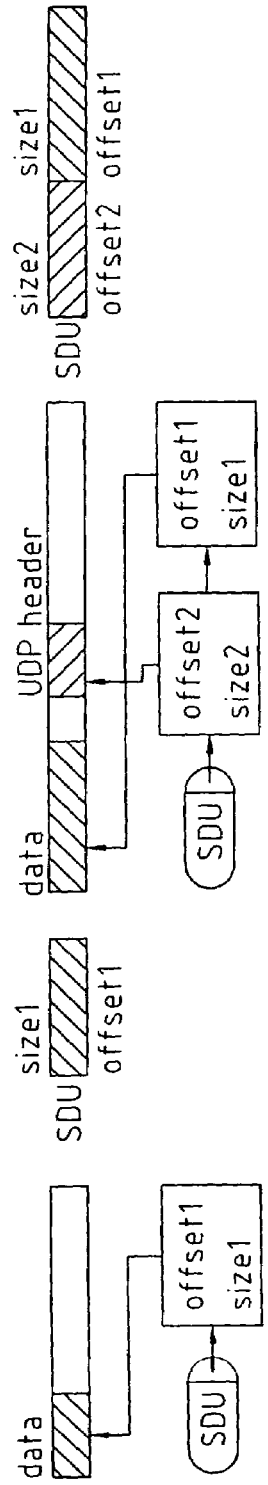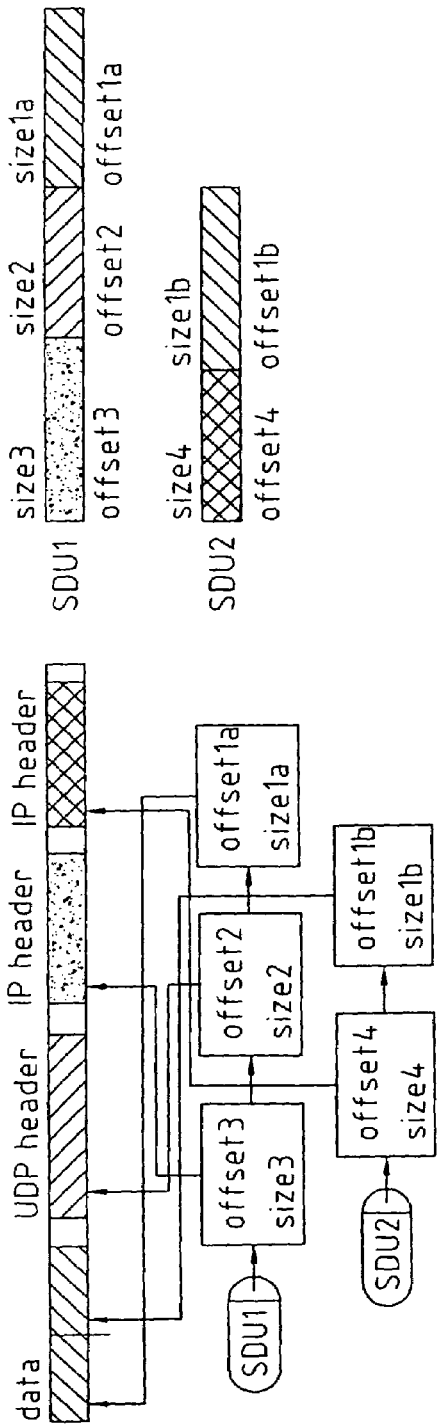

METHOD AND SYSTEM FOR COMMUNICATION BETWEEN APPLICATION PROGRAMS AND A NETWORK

The present invention relates to a method and system for communication between an application program and a network device driver program through intermediate structure software in an Object-Oriented Operating System (OS) that allows for object-oriented programming.

Application programs running on machines or computer systems in a distributed computing environment communicate with each other over a network. The sets of rules according to which these communications take place are called network protocols. To provide all needed communication functions the sets of rules are partitioned into groups of manageable size, with each group containing only those rules needed to perform some specific set of communication functions.

Known network protocols consist of intermediate structure software of layers that are used one on top of the other. The combination of these layers or intermediate structure software is referred to as network protocol stack. At the bottom of these stacks the physical drivers are arranged, which drivers are responsible for sending data to and receiving data from the actual network. At the top of the stack the user application program is arranged, which program generates and consumes data. Data used by a user application program travels, before being sent onto the physical network, down through the protocol stack, where it is manipulated by every protocol layer before finally arriving at the bottom layer where the manipulated data is put onto the physical network. Similarly, when data is received by the physical drivers, data travels upward through the protocol stack before it is delivered to the user application.

The invention provides a method for communication between an application program and a network device driver program through intermediate structure software, comprising the steps of:

a. supplying of application data units from the application program to a first program object or protocol object being part of the intermediate structure software;

b. performing of first functions of the first program object on the application data units;

c. supplying of resulting first data units from the first program object to a second program object being part of the intermediate structure software;

d. performing of second functions of the second program object on the first data units;

e. supplying of the resulting second data units to the network device driver program.

Besides the above-described two program objects or protocol objects of the intermediate structure software the method also comprises supplying data units to and from more than two program objects.

The present invention also provides a method for the communication between a network device driver program and an application program through intermediate structure software, comprising the steps of:

a. supplying of first data units from the network device driver program to a first program object or protocol object being part of the intermediate structure software;

b. performing of first functions of the first program object on said first data units;

c. supplying of resulting second data units from the first program object to a second program object being part of the intermediate structure software;

d. performing of second functions of the second program object on the second data units;

e. supplying of resulting application data units from the second program object to said application program.

The method according to the present invention provides for an optimal run-time environment and allows to build and change stacks at run-time, enables zero-copy architecture, manages timers and automates the logging of internal events.

Each program object or module provides a network protocol and all program objects together provide the network protocol stack.

Data transfer between two program objects or modules is accomplished through interconnecting queue-objects. References to data units in a interconnecting queue-object are passed between the program objects.

In a preferred embodiment, instead of using one queue for connection between two program objects, more than one queue can be implemented, wherein different queues are given different priorities, i.e. one queue can be used for normal traffic of data units, while another queue can be used for expedited data unit transfer. In another embodiment queue's with two or more priority levels, i.e. normal and expedited priority, are provided.

In yet another preferred embodiment it is possible, when a data unit moves down the protocol stack, to add protocol control information, for example as headers or trailers. This adding is called "encapsulation". When a data unit moves up the stack, this protocol control information is stripped off again. This stripping off is called "decapsulation". If a data unit needs to be passed down or up in multiple data units, this is called "fragmentation". Uniting multiple data units is called "defragmentation".

The present invention also provides a method wherein program objects in the intermediate structure software are added or removed during run time of the application program. This allows for changes to be made to the rules of communication with the network without interrupting the application programs or without even rebooting the computer system.

The present invention also provides a system for communication between an application program and a network device driver program and vice versa through intermediate structure software, comprising:

a. a first program object being part of the intermediate structure software and for performing of first functions on data units, said data units being transferred to and from the application program and data units being transferred to and from said first program object;

b. a second program object being part of the intermediate structure software and for performing of second functions on said data units, said data units being transferred to and from said second program object and data units being transferred to and from the network driver.

The present invention also provides a method for communication between a network device driver program and an application program through intermediate structure software, comprising the steps of:

a. supplying of application data units from the application program to a first program object or protocol object being part of the intermediate structure software;

b. performing of first functions of the first program object on the application data units;

c. supplying of resulting first data units from the first program object to a second program object being part of the intermediate structure software;

d. performing of second functions of the second program object on the first data units;

e. supplying of the resulting second data units to the network device driver program.

The present invention will now be described by way of preferred embodiments, with reference to the accompanying drawings throughout which like parts are referred to by like references, and in which:

FIG. 1 is a diagram shows schematically a personal computer connected to a network;

FIG. 2 is a diagram showing a known layer protocol stack;

FIG. 3 is a diagram illustrating a method and system according to a preferred embodiment of the method and system according to the present invention;

FIG. 4 is diagram showing a memory pool shared between program objects;

FIG. 5a is a diagram showing the memory layout of a data unit;

FIG. 5b is a diagram showing the logical structure of the data unit;

FIG. 6a is a diagram showing the memory layout of a data unit to which a UDP header is added;

FIG. 6b is a diagram showing a logical structure the data unit to which the UDP header is added;

FIG. 7a is a diagram showing a memory layout of FIG. 6a after fragmentation in two IP packets and after insertion of headers; and FIG. 7b is a diagram showing the logical structure of FIG. 6b after fragmentation in two IP packets and after insertion of headers.

FIG. 1 shows a personal computer or workstation that comprises a central processing unit 1, a random access memory 2, a read only memory 3 and a network adapter 5, all of which are connected through a bus 4. The network adapter 5 is attached to a network 7 which is in turn connected to a host computer 6. Instead of a personal computer a wide and varied range of devices can be used ranging from small embedded systems like cellular phones, to large high-performance video servers.

Network protocols are known that are combined into a layered structure, for example the network protocols of the OSI model, which is a standard for worldwide communications defining a framework for implementing protocols in seven layers.

In FIG. 2 a four layer protocol stack is shown, in which application program layer 8 handles the details of a particular application program, transport layer 9 provides a flow of data between two hosts, the network layer 10 handles the movement of data units around the network and the link layer 11 includes the network device driver program handling the actual physical interfacing with the network.

The internet model (TCP/IP) is a four layer protocol stack. Layer 8 includes a file transfer protocol (FTP) for downloading or uploading files, a simple mail transfer protocol (SMTP) for electronic mail, etc. The transport layer 9 is the Transmission Control Protocol (TCP) that is responsible for verifying the correct delivery of data. TCP adds support information to detect errors or lost data and to trigger retransmission until the data is correctly and completely received. Another transport layer 9 is the User Datagram Protocol (UDP), that sends data units (datagrams) from one host to another, without checking whether the data units reach their destination. In this embodiment the application program is responsible for reliable delivery thereof. As an example of a network layer 10 the Internet Protocol (IP) provides a routing mechanism that routes a message across the network. Application programs such as the File Transfer Protocol (FTP) or the Simple Mail Transfer Protocol (SMTP) are provided to respectively allow for downloading and uploading between different network sites and to allow for sending and receiving electronic mail messages from and to the network sites. A link layer 11 is provided for implementing ATM, IEEE 1394 or ethernet networks.

According to the preferred embodiment a specialized execution environment or also called metaspace is provided for the program objects which run on top of it. Each metaspace has for example its own message passing scheme that is adapted to the specific needs thereof. The specialized metaspace for network protocols and network protocol stacks is called mNet, the metaspace that supports device driver programs is called mDrive, and the metaspace for programming an application program is called mCOOP.

When a data unit is received by the physical drivers on mDrive, it travels through the protocol objects on mNet before it is consumed by the user application running on mCoop. Summarizing, the device driver programs run on mDrive, the network protocols objects run on mNet and application objects run on mCoop. The advantage of building these dedicated environments, for example the mNet for the implementation of protocol and protocol stacks, is that maximum support for the specific functionalities needed is provided.

In the mNet metaspace, a network protocol is implemented through one or more program objects called modules with a predefined set of methods or function. A protocol stack is implemented by interconnecting multiple modules with queue objects. Data units travel through-a set of interconnecting modules and each module performs some actions on the data units, that is, it adds or removes headers and trailers, fragments or defragments the data units etc. before passing it onto the next module.

In FIG. 3 the mNet metaspace and its position amongst the other metaspaces is shown. When a data unit is generated by an application program object 10 or 11 on mCoop, this data unit travels down the protocol objects 12–16 running on mNet, where it is manipulated by every program object. Program object 12 is in the internet model the Transmission Control Protocol (TCP), program object 13 is the User Datagram Protocol (UDP), program object 14 is the Internet Protocol IP, program object 15 is the Point to Point Protocol, which provides dial-up access over serial communication lines, and program object 16 provides an ATM-interface.

When the manipulated data unit arrives at the bottom layer, it is put on a physical network by the device driver programs 17 or 18 running on mDrive which provide a serial driver and an ATM-driver respectively.

A module has a predefined set of methods. These methods are invoked when certain actions or functions need to be performed by the modules. Limitation to this predefined set of methods allows for easier intermodule communications when building a protocol stack. It is however still possible to extend a module with extra methods at installation time or at run time.

A predefined set of methods is described hereafter:

Init: This method is activated when the module is created.

OpenTop, openBottom: A queue to this module, at the indicated side, is being created. The module can accept or reject the queue.

RejectTop, RejectBottom: A queue opened to this module has been rejected by one of the two modules involved.

AcceptTop, AcceptBottom: A queue opened to this module has been accepted by both modules involved.

ServiceTop, ServiceBottom: One or more SDUs are waiting to be processed on the queue connected to the top or bottom of this module.

CloseTop, CloseBottom: A queue connected to this module, at the indicated side, is being closed.

TimeOut: This method will be called whenever a timer for this module has expired.

Debug: Special method used for testing and debugging.

The top of a module connects to queues leading to modules implementing the next higher protocol layer. The bottom of a module connects to queues leading to modules that constitute the next lower protocol layer.

In a preferred embodiment of the invention two basic types of queue exist, atomic queues and streaming queues. Atomic queues preserve the SDU boundaries: the receiver will read exactly the same SDUs from the queue as were written by the sender on that queue. On a streaming queue, the receiver can read SDUs from the queue with a size that differs from that of the size of the SDUs that were originally written by the sender. Also data read from a streaming queue must be explicitly acknowledged before it is actually removed from the queue.

In another preferred embodiment program objects or modules can be interconnected using more than one queue. Using a priority mechanism, one queue can be used for normal traffic, while another queue can be used for expedited data transfer. The data from the expedited queue will be offered first to the module by the system.

In another preferred embodiment of the invention the program objects are interconnected bidirectionally by interconnecting queues, which queues have two priority levels for passing SDUs, i.e. normal priority and expedited priority. When an SDU is sent on a queue with expedited priority, it will arrive at the other end of the queue before all other SDU with normal priority.

The basic data unit that is used to pass information between the modules is called the Service Data Unit (SDU). SDUs are dynamic memory buffers, shared by all modules, used for data manipulations whereby physical copying of data is avoided as much as possible.

A module always iterates through the following steps:
receive a SDU from a queue;
process the SDU and update the internal state of the module;
send one or more SDUs to a next module;
optionally perform postprocessing; and
wait for the next SDU to be received.

Modules can be interconnected using queues at run time. These queues can also be removed at any time. This allows for the dynamic creation and configuration of protocol stacks.

A coding example showing in what way a protocol stack on mNet can be dynamically built, is given below. The code first looks for all protocol stack modules using the mNet::Find service: The modules are then interconnected with atomic queues using the mNetQueue::Open service.

```
void mNetMain( ) {
    SID sidLoop;
    SID sidATMiface;
    SID sidIP;
    SID sidUDP;
    SID sidTCP;
    InterfaceInfo interface;
    ProtocolInfo protocol;
    do {
```

```
        cout << "= INITIALISING STACK =" << endl;
        cout << "Locating stack components" << endl;
        mNet::Find("LoopInterface", sidLoop);
        mNet::Find("ATMiface", sidATMiface);
        mNet::Find("IP", sidIp)
        mNet::Find("UDP", sidUDP)
        mNet::Find("TCP", sidTCP);
        // IP and Loopback HAVE to be in the image.
        if (!(sidIp.IsValid( ) && sidLoop.IsValid( ))) {
            cout << RED "Can't build stack . . . " << endl;
            break;
        }
        cout << "Connecting components" << endl;
        interface.address = IPAdress("127.0.0.0");
        interface.netmask = IPAdress("255.0.0.0");
        interface.flags = IFF_LOOPBACK;
        mNetQueue::Open(sidIP, BOTTOM,
                    sidLoop, TOP,
                    FLOW_ATOMIC, 0,
                    sizeof(InterfaceInfo),
                    &interface
                    );
        if (sidATMiface.IsValid( )) {
            interface address =
                IPAdress((char*)myipaddr);
            interface.netmask =
                IPAdress("255.255.255.0");
            interface.flags = 0x00;
            mNetQueue::Open(sidIP, BOTTOM,
                    sidATMiface, TOP,
                    FLOW_ATOMIC, 0,
                    sizeof(InterfaceInfo)
                    &interface
                    );
        }
        if (sidUDP.IsValid( )) {
            protocol.protocol = IPPROTO_UDP;
            mNetQueue::Open(sidUDP, BOTTOM,
                    sidIP, TOP,
                    FLOW_ATOMIC, 0,
                    sizeof(ProtocolInfo),
                    &protocol
                    );
        }
        if (sidTCP.IsValid( )) {
            protocol.protocol = IPPROTO_TCP
            mNetQueue::Open(sidTCP, BOTTOM,
                    sidIP, TOP,
                    FLOW_ATOMIC, 0,
                    sizeof(ProtocolInfo),
                    &protocol
                    );
        }
        cout << "= DONE =" << endl;
    } while(0);
}
```

Data units travel through a set of interconnecting modules and each module performs some actions on the data units, before passing them to the next module. Since all these manipulations need to be performed as fast as possible, data units are not necessarily copied. Instead data references pointing to data units and queues are passed between the modules. Therefore all SDUs are managed by a central SDU Manager which manages a memory pool of data units. This memory pool is shared between the mNet SDU manager and all mNet modules and queues. In FIG. 4 SDUs 23 and 24 of program objects 20 and 21 are in the memory pool 22 which is managed by the SDU Manager 25. To avoid physical copying or moving of SDUs 23 or 24 in the shared memory pool 22 when going from one program object 20 to another program object 21, the SDUs are stored using references, which references point to the memory location of the SDU, and offsets and sizes of the data units within the SDU, as is shown in FIGS. 5–7.

Consider a program application that sends data units over an ATM network using the User Datagram Protocol (UDP). The application program first builds a SDU that contains the application data units. The original SDU memory lay-out of memory pool 22 is shown if FIG. 5*a* and the logical structure thereof is shown in FIG. 5*b*. The data contained in the SDU is stored in variable sized data units and the actual SDU is constructed by linking data units together at certain offsets. The SDU is then headed over to the UDP module. The UDP module adds the appropriate UDP header in front of the SDU. The effect of this action on the SDU organization is illustrated in FIG. 6*a* in which the resulting SDU memory-layout is shown and in FIG. 6*b* in which the logical structure thereof is shown. The UDP module then passes the SDU to the IP module. The IP module fragments the UDP datagram if needed and adds a IP header to every fragment. The effects of fragmentation and IP header insertion on the SDU is shown in FIG. 7*a* and FIG. 7*b*. Data units are then passed to the ATM driver that sends it over the network. Throughout these manipulations the SDU data unit is never copied or moved. The only actions involved are reorganizations of references to the SDU and reorganizations of offsets and sizes of a data unit in the SDU. This makes the communication method fast and reliable.

Managing the SDUs as described above provides the following advantages:

data can be shared between SDUs, that is copying or moving of data from one SDU to another is done by keeping references and reference counters instead of physically copying or moving the data;

adding data and removing data from an SDU can be accomplished without physically copying or moving the SDU contents;

SDU data does not have to be stored contiguously in memory.

In a further preferred embodiment the SDUs are organized, i.e. created, allocated, etc., in SDU pools, which are shared memory buffers. Every program object or module has attached to it one single SDU pool in which it creates SDUs and allocates data for the SDUs. In a preferred embodiment the intermediate structure software and the application program have different SDU pools which are optimized for their specific use. SDU pools are shareable amongst more than one program object or module. An advantage thereof is that important program objects can be allocated a larger SDU pool while a smaller SDU pool will suffice in case of a less important program objects. The SDU pools also provide indirectly for the local flow control mechanism of the protocol stack.

In another embodiment of the invention a naming service is provided for allowing program objects or modules to find other program objects or modules using symbolic names. That is a mapping is provided between the internal communication mechanism of the specific hardware configuration and symbolic names. These names can be mapped to the earlier described references and vice versa.

The present invention is not limited to the above given embodiments. The scope of the present invention is defined by the next claims, while many modifications to the above embodiments are possible within the scope thereof.

The invention claimed is:

1. Method for communication between an application program and a network device driver program through intermediate structure software, comprising the steps of:
   a. supplying of application data units from the application program to a first program object being part of the intermediate structure software;
   b. performing of first functions of the first program object on the application data units;
   c. supplying of resulting first data units from the first program object to a second program object being part of the intermediate structure software;
   d. performing of second functions of the second program object on the first data units;
   e. supplying of the resulting second data units to the network device driver program;
   wherein supplying data units between program objects is accomplished by passing references pointing to memory locations storing data of the data units such that the references are passed between program objects and the data of the data units is not passed directly between program objects, and
   wherein for at least one application data unit, the referenced memory location storing data of the application data unit is the same memory location as the referenced memory location storing at least some of the data of the corresponding first data unit and as the referenced memory location for storing at least some of the data of the corresponding second data unit.

2. Method according to claim 1, wherein data units are supplied over interconnecting queue-objects.

3. Method according to claim 2, wherein data units are supplied over interconnecting queue-objects, wherein the queue-objects have different priorities.

4. Method according to claim 1, wherein program objects are added during run time of the application program.

5. Method according to claim 1, wherein program objects are removed during run time of the application program.

6. Method according to claim 1, wherein after performing of functions of a program object and supplying the data units to a further program object additional functions of the program object are performed.

7. Method according to claim 2, wherein step a and/or c also comprises adding or removing information to or from said data units.

8. Method according to claim 1, also comprising dividing data units into data units parts or uniting data unit parts into data units.

9. Method according to claim 1, providing service data units containing one or more data units.

10. Method according to claim 9, referencing data units with a reference to the service data unit.

11. Method according to claim 1, also providing a specialized execution environment for communication between the application program and the network device driver program.

12. Method according to claim 1, wherein data units are organized in data unit pools adapted to the specific use thereof.

13. Method according to claim 1, providing a naming service for mapping between the internal communication mechanism of the hardware and symbolic names.

14. System for communication between an application program and a network device driver program and vice versa through intermediate structure software, comprising:
   a. a first program object being part of the intermediate structure software and for performing of first functions on data units, said data units being transferred to and from the application program and data units being transferred to and from said first program object;
   b. a second program object being part of the intermediate structure software and for performing of second functions on said data units, said data units being transferred to and from said second program object and data units being transferred to and from the network driver;

wherein transferring data units between program objects is accomplished by passing references pointing to memory locations storing data of the data units such that the references are passed between program objects and the data of the data units is not passed directly between program objects, and wherein for at least one data unit, data of the data unit is not moved from the referenced memory location of that data unit to a different memory location while the first program object performs said first functions and while the second program object performs said second functions.

15. System according to claim 14, wherein service data units are stored in a memory part using references.

16. System according to claim 14, provided with a SDU manager.

17. Method for communication between a network device driver program and an application program through intermediate structure software, comprising the steps of:

a. supplying of first data units form the network device driver program to a first program object or protocol object being part of the intermediate structure software;

b. performing of first functions of the first program object on said first data units;

c. supply of resulting second data units from the first program object to a second program object being part of the intermediate structure software;

d. performing of second functions of the second program object on the second data units;

e. supplying of resulting application data units from the second program object to said application program;

wherein supplying data units between program objects is accomplished by passing references pointing to memory locations storing data of the data units such that the references are passed between program objects and the data of the data units is not passed directly between program objects, and wherein for at least one application data unit, the referenced memory location storing data of the application data unit is the same memory location as the referenced memory location storing at least some of the data of the corresponding first data unit and as the referenced memory location for storing at least some of the data of the corresponding second data unit.

18. Method according to claim 3, wherein within a queue-object two or more priorities for passing of data units are provided.

19. Method according to claim 9, wherein at least two data units referenced by a service data unit are stored in non-contiguous portions of memory.

20. Method according to claim 11, wherein the specialized execution environment forms a plurality of network protocol layers and the first program object and the second program object are in respective network protocol layers.

21. Method according to claim 1, further comprising creating a service data unit for each application data unit, each service data unit including a size value indication the size of data of the application data unit and an offset value indicating the memory location storing data of the application data unite, wherein supplying data units between program objects by passing references includes passing service data units corresponding to the supplied data units.

\* \* \* \* \*